United States Patent [19]

Pleier et al.

[11] 4,116,296

[45] Sep. 26, 1978

[54] AUTOMATIC SEAT BRAKE

[75] Inventors: Walter J. Pleier, Bristol; James A. Wahl, Langhorne, both of Pa.

[73] Assignee: Eaton Corporation, Cleveland, Ohio

[21] Appl. No.: 775,825

[22] Filed: Mar. 9, 1977

[51] Int. Cl.² ............................................... B60T 7/02
[52] U.S. Cl. .................................... 180/101; 188/109; 303/19
[58] Field of Search ................... 180/101, 102, 103 R, 180/99; 188/109; 303/19

[56] References Cited

U.S. PATENT DOCUMENTS

| | | | |
|---|---|---|---|
| 3,360,305 | 12/1967 | Ryskamp | 180/101 |
| 3,653,724 | 4/1972 | Smith | 303/19 |
| 3,788,431 | 1/1974 | York | 180/101 |
| 3,790,223 | 2/1974 | Fontaine | 180/101 |
| 3,807,343 | 4/1974 | Peebles | 180/101 |

*Primary Examiner*—Joseph F. Peters, Jr.
*Assistant Examiner*—Donn McGiehan

*Attorney, Agent, or Firm*—Frank M. Sajovec, Jr.

[57] ABSTRACT

An electro-hydraulic automatic seat brake system which is effective to automatically set the hydraulic service brakes and shut down the engine of an industrial vehicle whenever the operator's seat is unoccupied. In order to release the brakes after the seat is reoccupied, the operator must turn on the engine ignition circuit and close a separate brake release switch. The system is charged immediately upon starting the engine by means of an engine-driven pump before other hydraulic components can be operated, and the charge is maintained when the engine is shut down by means of an accumulator. According to one aspect of the invention the hydraulic pressure on the service brakes is automatically released when a mechanical handbrake is set. According to another aspect of the invention means are provided to allow the engine to keep running when the operator's seat is unoccupied, provided that the vehicle transmission is in a neutral condition.

15 Claims, 3 Drawing Figures

AUTOMATIC SEAT BRAKE

The present invention relates generally to industrial vehicles, and more specifically to a parking brake system which automatically applies the vehicle brakes when the operator leaves the vehicle seat.

One of the safety features which has been available on industrial vehicles is a dead-man braking system. This system automatically applies the vehicle brakes whenever the vehicle seat becomes unoccupied. In some prior art systems the brakes are automatically released when the seat is reoccupied. Thus, if the truck is parked on an incline it can roll as soon as the operator reoccupies the seat. U.S. Pat. No. 3,892,294 discloses a mechanical system which obviates this problem; however, what the present invention intends to provide is an electro-hydraulic system which is integrated into the hydraulic service brake system of the vehicle.

Some problems associated with prior attempts to adapt such a system to the vehicle hydraulic brake system are those of relieving the hydraulic pressure on the service brake cylinders when the dead-man brake is released, and of insuring that the system is properly charged to insure that the system will actuate the brakes when the operator leaves his seat.

Based on the above, it is an object of the invention to provide a dead-man parking brake system which is integrated into the vehicle's hydraulic service brake system.

Another object of the invention is to provide a system which is automatically charged.

Another object of the invention is to provide a system which does not automatically disengage the brakes when the vehicle is reoccupied.

Another object of the invention is to provide a system which requires some conscious act on the part of an operator to disengage the brakes when he reoccupies the seat.

Another object of the invention is to provide a system which is discharged upon application of the mechanical hand brake.

To meet the above objectives the present invention provides an electro-hydraulic system wherein the service brakes are automatically set when the operator leaves the seat, but which are not released when the seat is reoccupied until the ignition is turned on and a separate switch is actuated. The actuating system is automatically charged when the vehicle engine is started, and is automatically discharged when the hand brake is applied.

According to a still further aspect of the invention, a bypass circuit can be provided to allow the engine to remain running when the seat is unoccupied, if the vehicle transmission is in neutral.

Other objects and advantages of the invention will become more apparent from the following description when taken in connection with the accompanying drawings, wherein.

Figure 1:
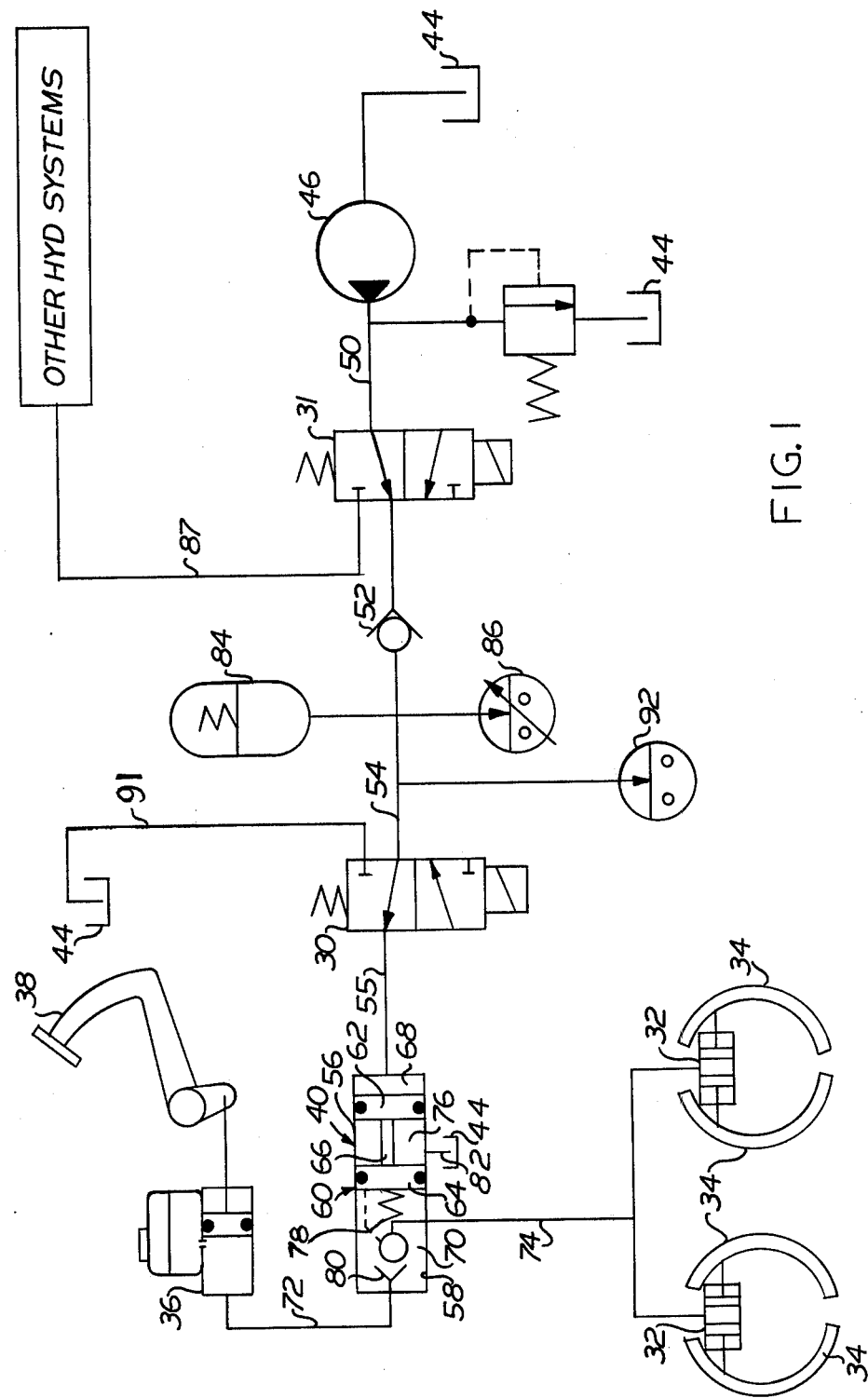
FIG. 1 is a schematic diagram of the hydraulic system of the invention.

Referring to the drawings, an operator's seat of an industrial vehicle is designated generally by the numeral 10. As shown, the seat is spring-loaded in an "up" position by means of a compression spring 12 acting between the seat and a portion of the vehicle frame. The seat is operatively connected, as shown diagrammatically, to a pair of normally open switches 14 and 16.

Switch 14 is connected in series with the vehicle ignition system which includes a conventional, key-operated ignition switch 18, a battery 20, ignition coil 22, points 24 and condenser 26. Thus, the seat switch 14 must be closed before the vehicle engine can be started.

Seat switch 16 is mechanically connected to switch 14 and closes simultaneously therewith when the seat is occupied. Switch 16 is connected in series with a normally open, solenoid-actuated switch 28 and a solenoid-actuated valve 30, which is operable to release the brakes in a manner to be described. A second solenoid valve 31 is also provided, and will also be described later.

Referring specifically to the hydraulic diagram, FIG. 1, the vehicle service brake system comprises one or more conventional wheel cylinder assemblies 32 actuating brake shoes 34, and a master cylinder 36, hydraulically connected to the wheel cylinders 32, and mechanically actuated by means of a pedal 38, in a conventional manner. In accordance with the present invention, an oil-to-oil actuator 40 for applying the service brakes in response to the operator vacating the seat is interposed into the hydraulic lines connecting the wheel cylinders to the master cylinder.

When an operator occupies the seat 10, switches 14 and 16 are caused to close, as described above. Upon manually closing the ignition switch 18, the vehicle engine can be started. At this point the solenoid valve actuating circuits are open, so that solenoid valves 30 and 31 are in the positions shown in FIG. 1. Once the engine starts, oil flow is established from a reservoir 44 through an engine-driven pump 46, through solenoid valve 31 via line 50, through check valve 52 and solenoid valve 30 via line 54, to the actuator 40 via line 55. At this point it should be noted that in accordance with the invention the service brakes are in a locked condition as described below.

The actuator 40 comprises a body 56 having a bore 58 which receives a piston assembly 60. The piston assembly comprises a first piston member 62, a second piston member 64 spaced from the first member, and a rod 66 mechanically connecting the two piston members. The piston assembly 60 and bore 58 define a first chamber 68 communicating with the line 55, and a second chamber 70 communicating with master cylinder 36 via line 72 and with wheel cylinders 32 via line 74, and a third or central chamber 76 between the piston members 62 and 64. The piston assembly 60 is biased to the right as shown in FIG. 1 by a spring 78. A check valve 80 within the second chamber 70 connects the lines 72 and 74 and is mechanically connected to piston member 64. A line 82 communicating with the central chamber 76 vents the chamber to the reservoir. The actuator illustrated is a wellknown commercial product, an example of which is manufactured by Minnesota Automotive Inc., in Mankato, Minnesota.

Figure 2:
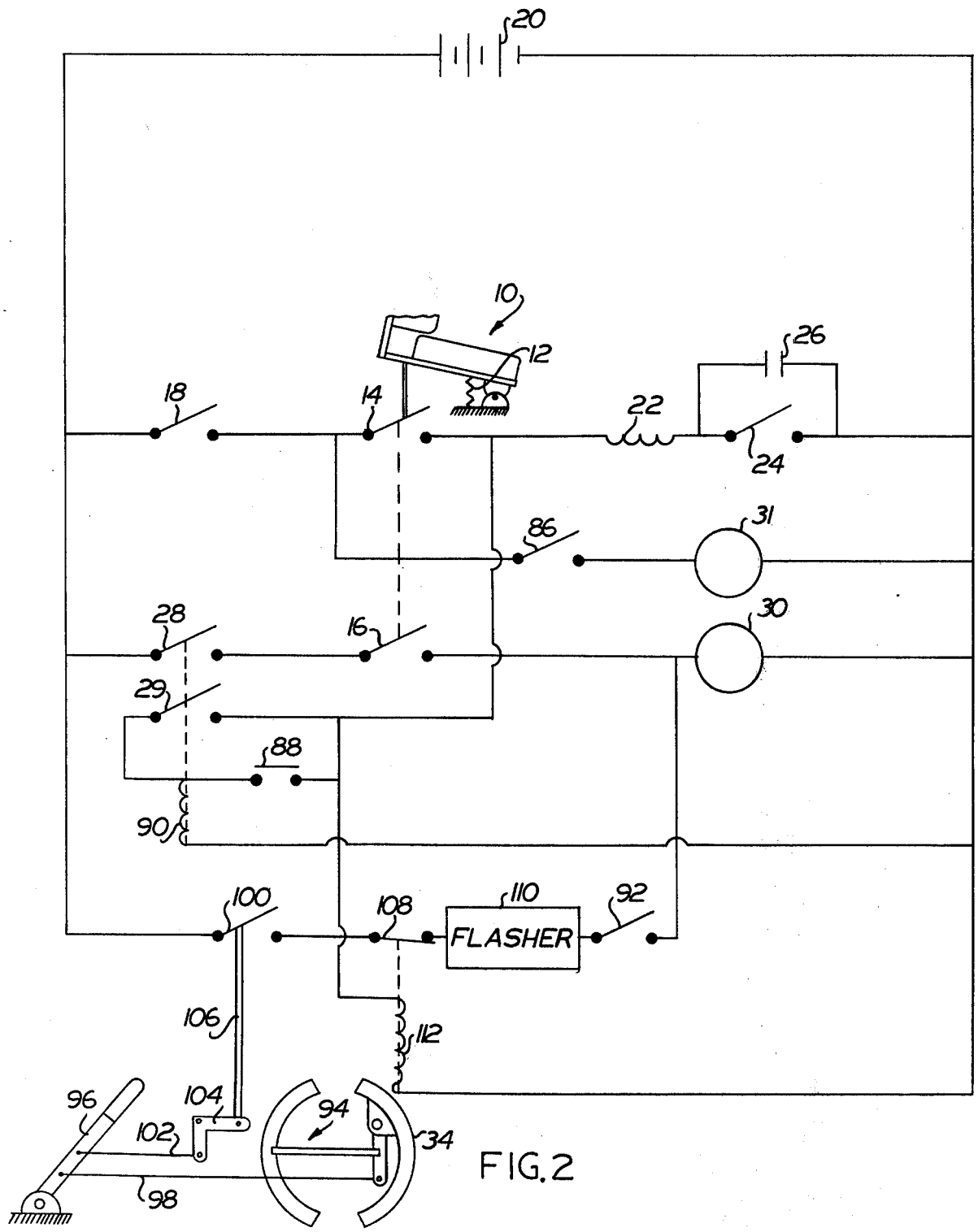
FIG. 2 is a schematic diagram of the electrical system of the invention.

When oil enters chamber 68 the piston assembly 60 is moved to the left closing an internal check valve 80 and blocking the flow of oil from the wheel cylinders 32 back to the master cylinder 36. Continued movement of the piston assembly 60 to the left forces oil from chamber 70 to the wheel cylinders 32, locking the service brakes. Once the wheel cylinders are filled and the brakes are locked, excess oil from the pump 46 will flow to an accumulator 84 communicating with line 54. When the accumulator is filled and the pressure in line 54 builds up to a predetermined level, a pressure switch 86 connected to line 54 closes. Referring to FIG. 2, the closing of pressure switch 86 closes the circuit to solenoid valve 31, shifting the valve upward as shown in FIG. 1, and directing oil via line 87 to the other hydraulic systems of the vehicle, such as power steering ad the lifting and tilting circuits. The accumulator 84 insures that pressure will be maintained in the brake circuit regardless of the operation of other hydraulic components. Check valve 52 insures that oil will not leak from the accumulator back to the solenoid valve 31.

In order to unlock the brakes to move the vehicle the operator must close a momentary-contact brake release switch 88 which closes a circuit to solenoid coil 90, which in turn closes solenoid actuated switches 28 and 29. Switch 29 maintains the circuit to coil 90 closed when the momentary-contact switch 88 is subsequently released, so long as seat 10 is occupied. When switch 28 is closed a circuit is completed to solenoid valve 30 shifting the valve upward as shown in FIG. 1, connecting chamber 68 with the reservoir 44 via line 91. As the pressure is relieved in chamber 68, the piston assembly 60 will return to the right allowing oil to flow from the wheel cylinders 32 back to chamber 70. When the piston assembly 60 moves to the right through its full stroke, check valve 80 opens, fully relieving the pressure on the wheel cylinders and releasing the brakes.

When the operator leaves the seat 10, spring 12 causes the seat to tilt upward, opening switches 14 and 16. The opening of switch 14 opens the ignition circuit to the engine, immediately shutting it down. The opening of switch 16 opens the circuit to solenoid valve 30, returning the valve to the position shown in FIG. 1. Opening of switch 14 also opens the circuit to solenoid coil 90, which opens switches 28 and 29.

When solenoid valve 30 returns to its normal position, oil flows from the accumulator 84 to chamber 68 of actuator 40, moving the piston assembly 60 to the left, and applying the brakes, as described above.

When the operator leaves the seat intentionally he will normally apply an independent, mechanical handbrake. Since it is considered to be undesirable to maintain pressure on the service brakes unless it is absolutely necessary, this invention provides means for relieving that pressure whenever the mechanical handbrake is applied.

Referring to FIG. 1, pressure switch 92 connected to line 54 is set to close when the pressure in accumulator 84 reaches a predetermined value somewhat lower than the set point of pressure switch 86. The parking brake is schematically represented in FIG. 2 as comprising a mechanical actuator assembly, designated generally by the numeral 94, acting on the brake shoes 34, and a hand lever 96 connected to the actuator assembly 94 by means of a rod or cable 98. The hand lever is also connected to a normally open switch 100 by means of a link 102 connecting the lever 96 with a bellcrank 104, and an actuating member represented diagrammatically at 106. It can be appreciated that this handbrake and switch structure is intended to be a schematic representation only, and that a commercial embodiment of such a structure can take any one of many well-known forms. In the illustrated embodiment, when the lever 96 is rotated counterclockwise, the brake shoes 34 are expanded by the actuator assembly 94, locking the brakes.

A conventional ratchet assembly (not shown) associated with the hand lever 96 can be used to hold the brakes in their locked condition until intentionally released. At the same time, the bellcrank 104 will rotate clockwise, closing the switch 100.

The switch 100 is connected in series with a solenoid-actuated, normally closed switch 108, a flasher unit 110, and pressure switch 92, and circuit with solenoid valve 30. The flasher is a commercially available circuit interrupter unit which is effective to alternately make and break the circuit through it. Examples of such flasher units are available from Tung-Sol Electric, Inc. of Newark, New Jersey. When the ignition switch 18 and seat switch 14 are closed, coil 112 is energized, holding switch 108 open. When the ignition switch 18 and/or seat switch 14 is open, coil 112 is deenergized, and switch 108 closes. When the handbrake is actuated switch 100 is closed, completing the circuit through switch 100, switch 108, flasher 110 and pressure switch 92, and solenoid valve 30. Current flows intermittently, by virtue of the flasher, to the solenoid valve 30 alternately moving the valve to direct the oil stored in the accumulator 84 to the actuator 40 and from the actuator to the reservoir. Since the engine ignition circuit is open at this point, pump 46 will not function to maintain pressure in the system; therefore, when the accumulator pressure drops to a level below the set point of pressure switch 92 the switch opens, opening the circuit to solenoid valve 30, and returning the solenoid valve to the position shown in FIG. 1. Thus, the hydraulic pressure on the service brakes is relieved, and the vehicle is held motionless by the handbrake only. At this point the system is in condition to be recharged when the engine is started and the handbrake is released. It can be appreciated that this system does not affect the normal operation of the vehicle service brake system through pedal 38 and master cylinder 36.

The above system causes the brakes to be applied and the engine shut down every time that the operator leaves his seat; however, it is recognized that this is not always desirable. In accordance with one aspect of the invention the brakes are automatically applied when the seat is unoccupied, but the engine is permitted to run as long as the vehicle transmission is in neutral.

Figure 3:
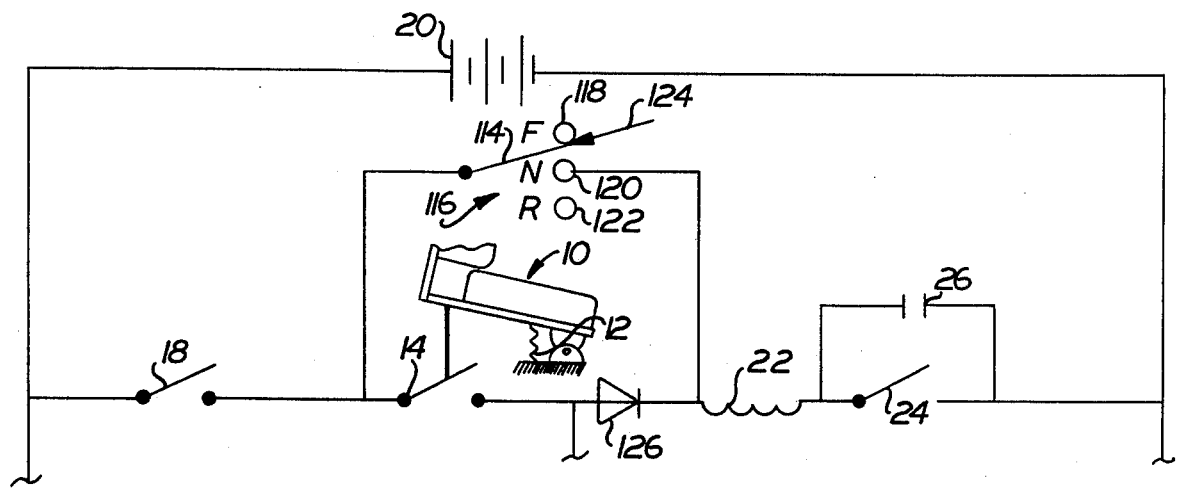
FIG. 3 is a schematic diagram of a portion of the electrical system of FIG. 1, illustrating an alternate embodiment.

In FIG. 3, a circuit to accomplish the above is shown bypassing seat switch 14. Switch 114 is illustrated as being associated with a transmission control designated generally by the numeral 116, and illustrated schematically as including forward contact 118, neutral contact 120, reverse contact 122 and a movable control element represented by the numeral 124 and linked to the switch 114. As illustrated, the switch 114 is closed only when the transmission control is in a neutral position. A diode 126 prevents current flow to switch 29 when switch 114 is closed. With switch 114 installed as shown, if the ignition switch 18 is left on, the engine will keep running if the operator leaves the seat 10, but only if the transmission is in neutral. It can be appreciated that the above bypass circuit can be omitted if it is considered desirable to have the engine shut down whenever the seat is unoccupied, regardless of transmission position.

We claim:

1. In a vehicle having a hydraulic service brake system and a movable operator's seat having an occupied position and an unoccupied position: an emergency brake actuation system comprising a hydraulic pressure source independent of said hydraulic service brake system; an oil-to-oil actuator connected to said independent hydraulic pressure source and to said hydraulic service brake system and operable to pressurize said hydraulic service brake system in response to the application of pressure by said independent hydraulic pressure source; hydraulic circuit means including first selector valve means connected between said independent hydraulic pressure source and said actuator, said first selector valve means having a first position directing oil from said independent hydraulic pressure source to said oil-to-oil actuator to pressurize said hydraulic service brake system, and a second position directing oil to a reservoir to depressurize said hydraulic service brake system; a first solenoid actuator energizable to shift said first selector valve means from said first position to said second position; a first seat switch in circuit with said first solenoid actuator; and control means including control switch means in circuit with said first seat switch and with said first solenoid actuator, said first solenoid actuator being energized only when both said first seat switch and said control switch means are closed.

2. Apparatus as claimed in claim 1 including master switch means for energizing said vehicle prime mover, and second seat switch means operatively connected to said vehicle seat and in series with said master switch means, said second seat switch means being closed when said seat is in its occupied position and open when said seat is in its unoccupied position, said prime mover being energized only when both said master switch and said second seat switch are closed.

3. Apparatus as claimed in claim 2, in which said control means comprises first and second normally open switch elements, a first switch actuator coil operatively connected to said first and second switch elements and operable to close said switch elements when said first switch actuator coil is energized, said first switch element being in series with said first seat switch and said second switch element being in series with said second seat switch, said control switch means comprising a momentary contact switch operable to energize said first switch actuator coil to close said first and second normally open switch elements, closing of said first normally open switch element and said first seat switch being effective to energize said first solenoid actuator to move said valve from said first position to said second position, and closing of said second switch element being effective to maintain said first switch actuator coil energized when said momentary contact switch is opened.

4. Apparatus as claimed in claim 1, including a vehicle prime mover and hydraulically actuated auxiliary components, in which said independent hydraulic pressure source includes a pump driven by said prime mover, an accumulator charged by said pump, second selector valve means movable between a first position directing the output of said pump to said accumulator and a second position directing the output of said pump to said auxiliary components, and pressure responsive means operable to move said second selector valve means from its first position to its second position when the pressure in said accumulator reaches a predetermined value.

5. Apparatus as claimed in claim 4, including a second solenoid actuator operable to move said selector valve from said first position to said second position, and pressure responsive means comprising a pressure switch operable to complete an electrical circuit to energize said second solenoid actuator.

6. Apparatus as claimed in claim 5 in which said vehicle includes master switch means for energizing said prime mover, said pressure switch means being connected in series with said master switch means.

7. Apparatus as claimed in claim 1, including hand brake actuating means comprising linkage means operable to engage vehicle brake means independent of said hydraulic service brake system, lever means operatively connected to said linkage means and movable between a brake released position and a brake applied position, brake switch means operatively connected to said lever means and movable between an open position when said lever means is in its brake released position and a closed position when said lever means is in its brake applied position, and means in series with said brake switch means operable to move said first selector valve means to its second position when said lever is moved to its brake applied position.

8. Apparatus as claimed in claim 1, including bypass circuit means bypassing said first seat switch means for energizing said first solenoid actuator, hand brake actuating means comprising linkage means operable to engage vehicle brake means independent of said hydraulic service brake system, lever means operatively connected to said linkage means and movable between a brake released position and a brake applied position, brake switch means in said bypass circuit means and operatively connected to said lever means for movement between an open position when said lever means is in its brake released position and a closed position when said lever means is in its brake applied position, closing of said brake switch means being effective to close said bypass circuit means to energize said first solenoid actuator.

9. Apparatus as claimed in claim 8, in which said bypass circuit comprises circuit interrupter means in series with said brake switch means and said first solenoid actuator.

10. Apparatus as claimed in claim 8, including a normally closed switch in series with said brake switch means, second seat switch means operatively connected to said vehicle seat and operable to close a circuit to said prime mover, said second seat switch means being closed when said seat is in its occupied position and open when said seat is in its unoccupied position, a second switch actuator coil in series with said second seat switch means and operable to hold said normally closed switch open when energized, whereby said bypass circuit means is opened whenever said seat is in its occupied position and said second seat switch is open.

11. Apparatus as claimed in claim 8 in which said independent hydraulic pressure source comprises an accumulator, including a normally open pressure switch in said bypass circuit means in series with said brake switch means, said pressure switch being operable to close when the pressure in said accumulator is at least a predetermined value.

12. Apparatus as claimed in claim 11 in which said bypass circuit comprises circuit interrupter means in series with said brake switch means and said pressure switch, whereby said valve is alternately moved between its first and second positions until said accumulator pressure is reduced to a value insufficient to cause said pressure switch to close.

13. Apparatus as claimed in claim 12, including a normally closed switch in series with said brake switch means, second seat switch means operatively connected to said vehicle seat and operable to close a circuit to said prime mover, said second seat switch means being closed when said seat is in its occupied position and open when said seat is in its unoccupied position, a second switch actuator coil in series with said second seat switch means and operable to hold said normally closed switch open when energized, whereby said bypass circuit means is opened whenever said seat is in its occupied position and said second seat switch is open.

14. Apparatus as claimed in claim 1 in which said vehicle includes transmission control means movable between a neutral position and one or more operating positions, including second seat switch means operatively connected to said vehicle seat and operative to close a circuit to said vehicle prime mover when closed, said second seat switch means being closed when said seat is in its occupied position and open when said seat is in its unoccupied position, seat switch bypass circuit means bypassing said second seat switch means, said bypass circuit means comprising a normally open switch operatively connected to said transmission control means and movable to a closed position when said transmission control means is in its neutral position.

15. Apparatus as claimed in claim 14, in which said control means comprises first and second normally open switch elements, a first switch actuator coil operatively connected to said first and second switch elements to close said switch elements when said first switch actuator coil is energized, said first switch element being in series with said first seat switch and said second element being in series with said second seat switch, said control switch means comprising a momentary contact switch operable to energize said solenoid actuator to close said first and second normally open switch elements, closing of said first normally open switch element and said first seat switch element being effective to energize said first solenoid actuator to move said first selector valve means from said first position to said second position, and closing of said second switch element being effective to maintain said first switch actuator coil energized when said momentary contact switch is opened, said seat switch bypass circuit further including diode means preventing current flow to said second switch element when said seat switch bypass circuit is closed.

* * * * *

UNITED STATES PATENT AND TRADEMARK OFFICE
CERTIFICATE OF CORRECTION

PATENT NO. : 4,116,296
DATED : 9/26/78
INVENTOR(S) : Walter J. Pleier; James A. Wahl It is certified that error appears in the above-identified patent and that said Letters Patent are hereby corrected as shown below:

Column 3, line 9: "ad" should read ---and---.

Column 4, line 8: insert "in" between ---and circuit---.

Signed and Sealed this

Second Day of January 1979

[SEAL]

Attest:

RUTH C. MASON
Attesting Officer

DONALD W. BANNER
Commissioner of Patents and Trademarks